(12) United States Patent
Mhirsi et al.

(10) Patent No.: US 6,967,939 B2
(45) Date of Patent: Nov. 22, 2005

(54) RADIO COMMUNICATION SYSTEM USING WIDEBAND CODE DIVISION MULTIPLE ACCESS (WCDMA)

(75) Inventors: Karim Mhirsi, Swindon (GB); David Stuart Muirhead, Cheltenham (GB); Steven Andrew Wood, Hotwells (GB)

(73) Assignee: Lucent Technologies Inc., Murray Hill, NJ (US)

( * ) Notice: Subject to any disclaimer, the term of this patent is extended or adjusted under 35 U.S.C. 154(b) by 836 days.

(21) Appl. No.: 09/873,069

(22) Filed: Jun. 1, 2001

(65) Prior Publication Data

US 2002/0015441 A1 Feb. 7, 2002

(30) Foreign Application Priority Data

Jun. 6, 2000 (EP) .................................. 00304776

(51) Int. Cl.[7] ............................................ H04B 7/216
(52) U.S. Cl. ...................................... 370/335; 370/342
(58) Field of Search ................................ 370/320, 334, 370/335, 342, 537, 538, 539, 540; 375/142, 375/143, 144, 148, 150, 152, 299, 347

(56) References Cited

U.S. PATENT DOCUMENTS

| | | | | |
|---|---|---|---|---|
| 6,269,126 | B1 * | 7/2001 | Toskala et al. ............. | 375/265 |
| 6,463,048 | B1 * | 10/2002 | Garyantes ................... | 370/342 |
| 6,480,526 | B1 * | 11/2002 | Shoki et al. ................ | 375/147 |
| 6,496,551 | B1 * | 12/2002 | Dam et al. .................. | 375/347 |
| 6,507,603 | B1 * | 1/2003 | Haga et al. ................. | 375/147 |
| 6,683,906 | B1 * | 1/2004 | Iwamatsu .................... | 375/142 |
| 2002/0039884 | A1 * | 4/2002 | Raynes et al. ............. | 455/13.3 |
| 2002/0154705 | A1 * | 10/2002 | Walton et al. .............. | 375/267 |

FOREIGN PATENT DOCUMENTS

| | | | | |
|---|---|---|---|---|
| EP | 0 667 686 A2 | 8/1995 | .......... | H04B 1/707 |
| EP | 0 998 052 A2 | 3/2000 | .......... | H04B 1/707 |

OTHER PUBLICATIONS

European Search Report dated Nov. 24, 2000.

* cited by examiner

*Primary Examiner*—Ricky Ngo
*Assistant Examiner*—Jay P. Patel

(57) ABSTRACT

A third generation general partnership program radio communication system or a universal mobile telephone system employs a wide band code division multiple access system. The codes in various incoming signals from different sources are identified by cross correlation using a code matched filter. A multiplexer, samples the signals from each of the P sources at P times the chip rate of the codes in the incoming signals. The mutliplexer time multiplexes the received signals and feeds them to single delay line consisting of N stages each having P elements. Each stage will thus store one sample from each of the P sources. A selected element in each stage has an output which feeds a corresponding input of a code matched filter dot-product adder chain to enable a cross-correlation to be established for each incoming signal in turn.

3 Claims, 3 Drawing Sheets

RADIO COMMUNICATION SYSTEM USING WIDEBAND CODE DIVISION MULTIPLE ACCESS (WCDMA)

CROSS-REFERENCE TO RELATED APPLICATION

This application claims priority of European Patent Application No. 0030776.8, which was filed on Jun. 6, 2000.

FIELD OF THE INVENTION

The present invention relates to radio communication systems operating using the third generation general partnership program standard (3GPP) or employing code division multiple access systems (WCDMA).

DESCRIPTION OF THE PRIOR ART

As shown in FIG. 1, mobile telephone systems are arranged in a series of base stations with each base station 2 communicating with a plurality of mobile phones 4 in the zone in which it operates. Each base station employs an array of antenna for transmitting signals to and receiving signals from each mobile station in its zone.

Each zone may be subdivided into three sections A, B and C each subtending 120° about the base station with a pair of spaced antennae 6, 8, 10, 12, 14 and 16 operating within each sector. Typically, each mobile station 4 within one sector C will transmit signals to both antennae 6, 8 within its own sector as well as to the two antennae 10, 12 in the nearest adjacent sector A. Each of the four transmissions will have a different path and in all probability a different propagation time.

With WCDMA systems, the base station 2 causes each mobile station 4 to transmit on a carrier code which is unique to that mobile station and since the base station stores that code, it can, by correlating the stored code with the carrier code received, determine the delay suffered by each of the four signals from the same mobile station received by the four different antenna 6, 8, 10 and 12. This allows the four signals to be combined to produce a stronger resultant signal.

Cross correlation is performed by a code matched filter. Code matched filters require a large amount of hardware resource and so the common approach is to use the same code matched filter hardware so that it can perform searches for all four alternative antenna FIG. 2 shows one example of a code matched filter.

As shown, four input signals S#1, S#2, S#3 and S#4 from the relevant four antenna 6 to 12 are fed to respective ones of four separate inputs of multiplexing system 18. The multiplexer 18 has four outputs which are connected to respective inputs of four delay lines 20, 24, 24 and 26. Each delay line consists of N stages each stage of which may be in the form of a tapped shift register. Each signal S#1 to S#4 received by the multiplexer is composite signal consisting of a series of codes superimposed on one another. Each code is generated by a different mobile station so that the base station must first search for the code by correlating with that code, in order to extract the data transmitted by that mobile station. The codes consist of a series of so-called chips of equal duration. In operation, the multiplexer 18 samples the signal #1 and inserts the first sample into the first stage 20A of the delay line 20. The multiplexer 18 samples the signal S#2 and inserts the first sample into the first stage 22A of the second delay line 21. The multiplexer 18 then samples the first sample of the signal S#3 and inserts it into the first stage 24A of the third delay line 24. The multiplexer 18 then samples the first sample signal S#4 and inserts it into the first stage 26A of the fourth delay line 26. The cycle is then repeated for the second and successive samples of the four signals #1 to #4 until each stage of each line is filled. The four first stages 20A to 26A are served by a multiplexer 28A and each successive four stages are served by a respective multiplexer 28A to 28N where N is the number of stages involved. The multiplexers 28A to 28N acts in concert to sample simultaneously all the samples of the first signal S#1 followed by all the samples of the second signal S#2 followed by all the samples of the third signal S#3 followed by all the samples of the fourth signal S#4 whereupon the cycle is repeated at the sampling rate.

The outputs of the multiplexers 28A to 28N are fed simultaneously to a code matched filter (CMF) dot-product adder chain which performs a correlation operation with the code of the signal which needs to be decoded. The samples are then shifted along each line with a new sample entering the four first stages 20A to 28A and the samples in the four last stages 20N to 28N being discarded. The correlation operation is repeated at intervals equal to the sampling rate until a correlation has been achieved at which point the timing of the code in each of the four signals S#1 to S#4 can be established and appropriate processing following demultiplexing in a demultiplexer 32 can be effected to extract and additively combine the data from the four signals S#1 to S#4 attributable to the selected mobile station 4.

As can be appreciated, the implementation of the system requires four delay lines each of N stages and N multiplexers with interconnections to the different the stages of the different delay lines. This represents a considerable amount of hardware.

It is an object of the invention to provide an improved radio communication system.

SUMMARY OF THE INVENTION

According to the present invention there is provided a radio communication system comprising a base station and a plurality of mobile stations arranged to communicate therewith using a wide band code division multiple access multiplexing technique, the base station operating at a known sampling rate and having a plurality of P separate antennae each arranged to receive a time displaced signal from each mobile station, a multiplexing system for multiplexing the outputs of the antennae at a rate of P times the sampling rate so that the first sample taken from the output of each of the P antenna occurs in a succession of P first samples followed by the P second samples and so on progressively with subsequent samples, a tapped delay line having P×N serially connected elements connected to the output of the multiplexer system with each $P^{th}$ element having a tapped output, and a N input correlation means connected to the N outputs of the delay line and operative to cross correlate the outputs from this tapped delay line with a locally generated code signal.

BRIEF DESCRIPTION OF THE DRAWINGS

A radio communication system embodying the present invention, will now be described, by way of example, with reference to the accompanying diagrammatic drawings, in which.

DETAILED DESCRIPTION

Figure 1:
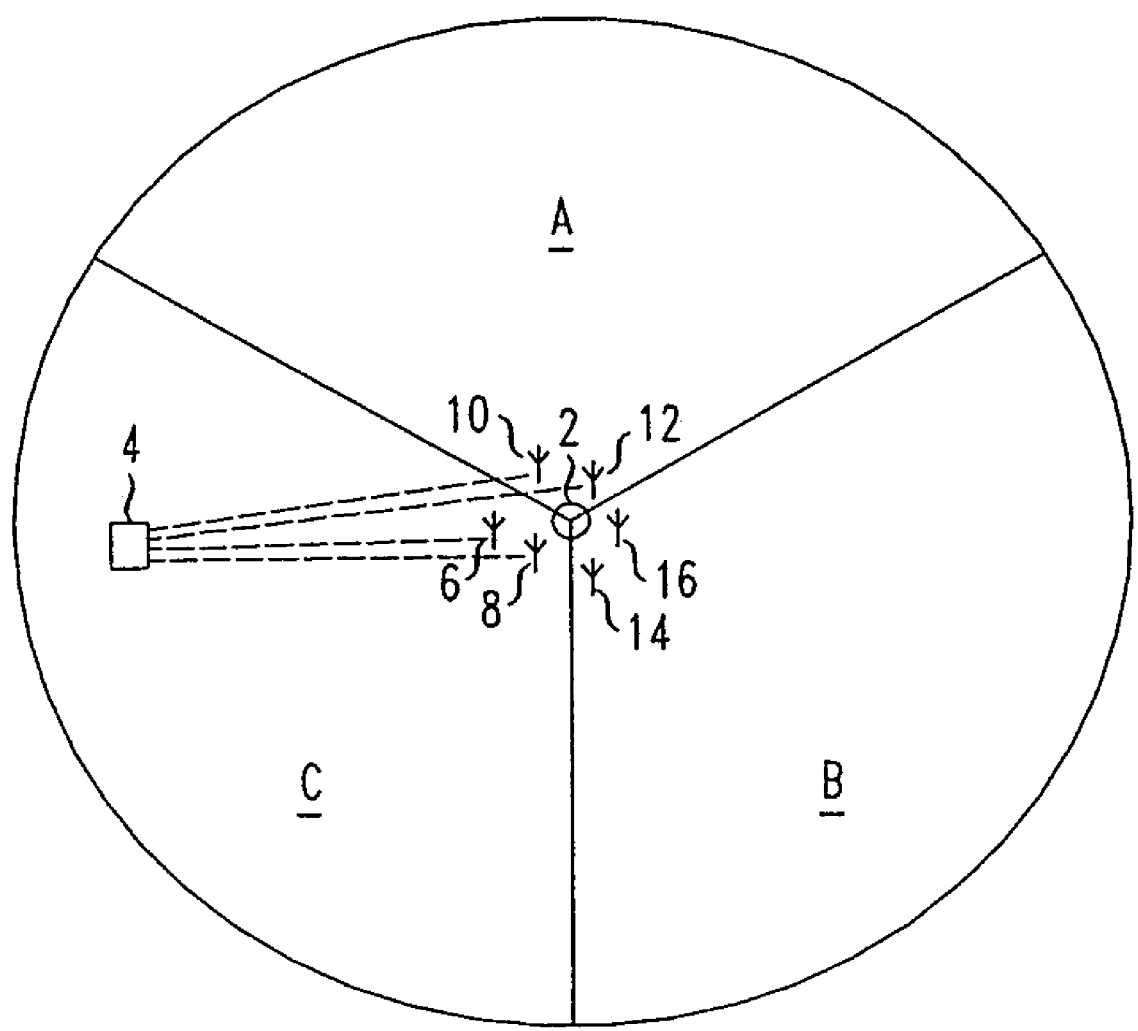
FIG. 1 is a schematic view of a mobile station in a base station cell.
Figure 2:
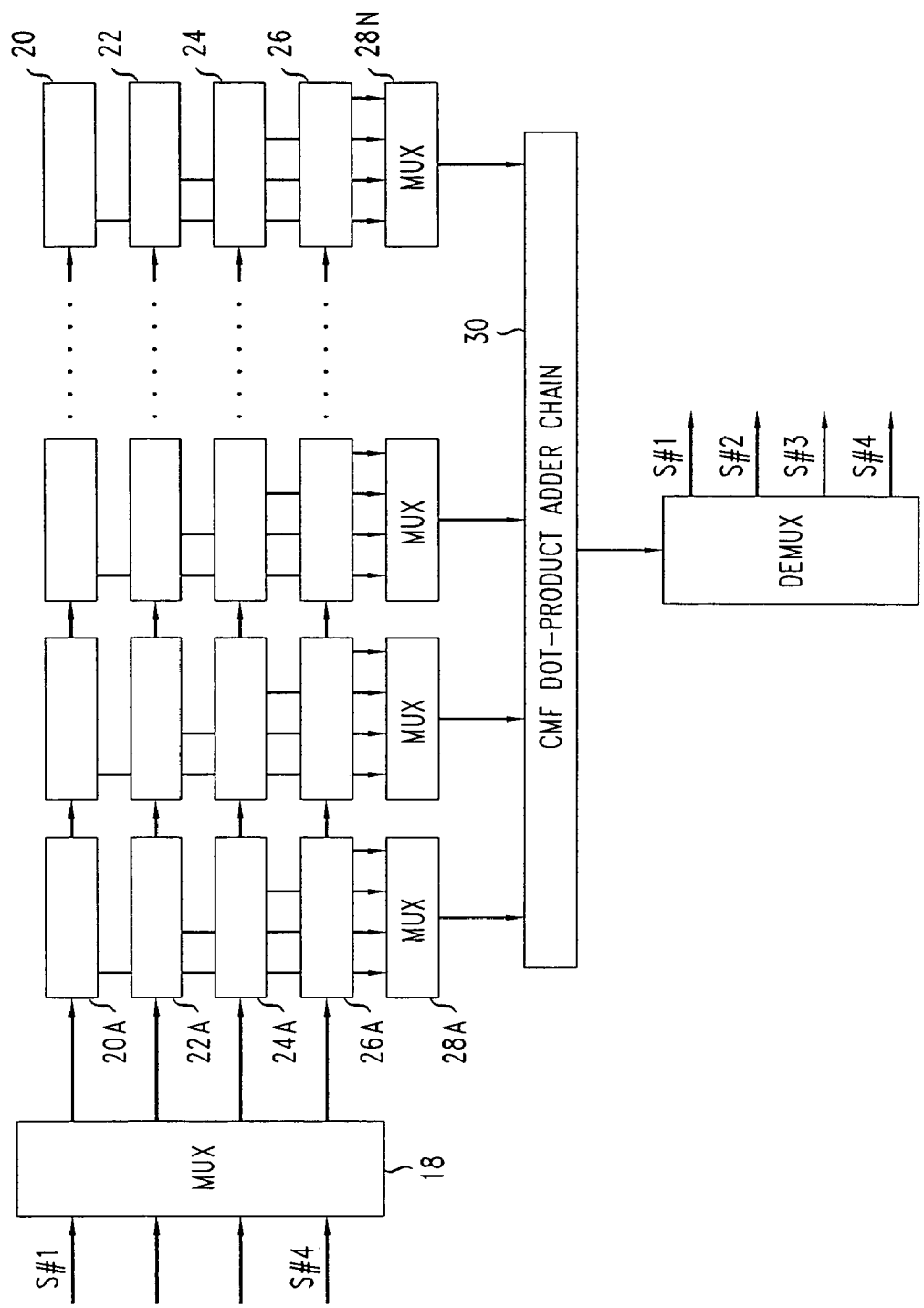
FIG. 2 is a block diagram of a previously proposed code matched filter.
Figure 3:
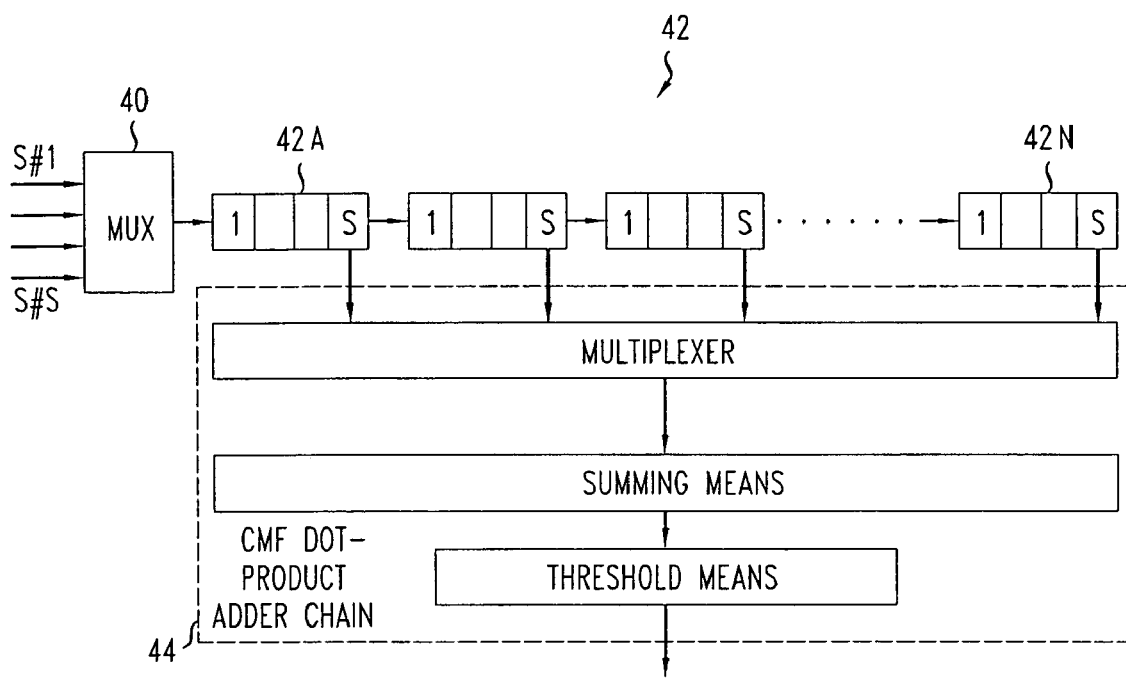
FIG. 3 is a block diagram of a code matched filter embodying the present invention.

The code matched filter embodying the invention is shown in FIG. 3.

As shown, the four input signals S#1 to S#4 are fed to respective ones of four inputs of a multiplexer 40 operating at four times the speed of the multiplexer 18 i.e. at four times the chip rate. The four inputs are multiplexed into a signal output which feeds an input of single delay line 42 having N stages 42A to 42N.

Each stage 42A comprises a four element register with the last element of each stage feeding an output to a respective input of a code matched filter dot-product adder chain.

As the delay line 42 fills up, it will be appreciated that the last element in each register will successively contain all the chips of each of the four signals S#1 to S#4 in turn.

Accordingly, by operating the CMF dot-product adder chain 44 at four times the frequency of the chain 30 of the previously proposed system, the CMF dot-product adder chain 44 is, in effect, time multiplexed in the same order as the input samples which are time multiplexed by the input multiplexer 40.

The CMF dot-product adder chain includes a multiplier for multiplying the signal arriving at each input with a coefficient determined by a code identifying the mobile station under consideration. Summing means sums the resultant products for each input and a threshold device monitors the sum of the products and generates a signal indicative of a correlation being achieved when the sum of the products exceeds a predetermined threshold.

With this arrangement, it will be appreciated that the substantial delay line multiplexing circuits are no longer necessary. This saves hardware resource and removes a layer of digital logic that would otherwise introduce delays into the processing chain.

In addition to the searching process. This arrangement will be of benefit to other receiver units in a WCDMA receiver. In particular, the 3GPP standard includes a random-access channel that employs signals that are multiplexed in the time-division manner described above. The same approach can be used to significantly reduce the hardware required to realise a design of a random access channel receiver/detector in the 3GPP standard.

Changes may be made in the combination and arrangement of the elements as herein before set forth in the specification and shown in the drawings, it being understood that changes may be made in the embodiment disclosed without departing from the spirit and scope of the invention and defined in the following claims.

What is claimed is:

1. A radio communication system comprising a base station and a plurality of mobile stations arranged to communicate therewith using a wide band code division multiple access multiplexing technique, the base station operating at a known sampling rate and having a plurality of P separate antennae, where P is an integer greater than one, each arranged to receive a time displaced signal from each mobile station, a multiplexing system for multiplexing the outputs of the antennae at a rate of P times the sampling rate so that the first sample taken from the output of each of the P antenna occurs in a succession of P first samples followed by the P second samples and so on progressively with subsequent samples, a tapped delay line having P×N serially connected elements, where N is an integer greater than zero, connected to the output of the multiplexer system with each $P^{th}$ element having a tapped output, and a N input correlation means connected to the N outputs of the delay line and operative to cross correlate the outputs from this tapped delay line with a locally generated code signal.

2. The system according to claim 1, wherein the correlation means comprises multiplying means for multiplying the signal arriving at each input with a coefficient determined by said locally generated code, summing means for summing the resultant products for each said inputs, and threshold means for monitoring when each sum exceeds a predetermined threshold to provide a indication of correlation.

3. The system according to claim 1 or to claim 2, wherein P equals four with two of the four antenna operating in one 120° segment allocated by the base station and the remaining two antenna operating in an adjacent 120° segment allocated by the base station.

* * * * *